United States Patent [19]

Hereth

[11] 4,001,474
[45] Jan. 4, 1977

[54] HONEYCOMB PANEL CELLULAR STRUCTURE HAVING TRIANGULAR CELLS

[75] Inventor: Ralph F. Hereth, Port Orchard, Wash.

[73] Assignee: Wilkins & Associates, Inc., Tacoma, Wash.

[22] Filed: Aug. 26, 1974

[21] Appl. No.: 500,642

[52] U.S. Cl. ................................ 428/116; 52/618; 428/188
[51] Int. Cl.² ......................................... B32B 3/12
[58] Field of Search ......... 29/455 LM; 52/615–618; 181/33 G; 156/197; 161/68–69, 127–139; 428/73, 116, 117, 118, 119, 120, 178, 188

[56] References Cited
UNITED STATES PATENTS

| | | | |
|---|---|---|---|
| 1,825,770 | 10/1931 | Barnett | 181/33 G |
| 2,020,639 | 11/1935 | Grayson et al. | 161/123 X |
| 2,050,074 | 8/1936 | Trytten | 181/33 G |
| 2,369,006 | 2/1945 | Banks | 161/68 X |
| 2,577,120 | 12/1951 | Franz | 211/71 |
| 2,873,008 | 2/1959 | Ashman | 52/618 X |
| 3,137,602 | 6/1964 | Lincoln | 161/69 X |
| 3,264,153 | 8/1966 | Rodman et al. | 156/79 |
| 3,339,326 | 9/1967 | Derr et al. | 52/309 |
| 3,391,511 | 7/1968 | Harris et al. | 161/69 X |
| 3,892,898 | 7/1975 | Yasui | 428/116 |

FOREIGN PATENTS OR APPLICATIONS 1,023,858   3/1966   United Kingdom ................ 161/68

Primary Examiner—George F. Lesmes
Assistant Examiner—Henry F. Epstein
Attorney, Agent, or Firm—Dowrey & Cross

[57] ABSTRACT

The cellular structure is made up of a series of interengaged cell segments which form a series of triangular cells. The cell segments each include an equilateral generally triangular main body portion and a flat leg portion projecting from one tip of the main body portion. The outer surface of each leg portion is parallel to the outer surface of the main body portion wall opposite the tip from which the leg portion projects. Each leg portion extends to and engages a groove formed in the tip of an adjacent cell segment to provide a continuous outer surface to which a panel facing sheet may be secured. Another panel facing sheet may be secured to the outer surface of the main body portion opposite wall.

10 Claims, 5 Drawing Figures

HONEYCOMB PANEL CELLULAR STRUCTURE HAVING TRIANGULAR CELLS

BACKGROUND OF THE INVENTION

This invention relates to honeycomb cellular structures utilized in so-called "sandwich" or laminated panel constructions in which outer facing sheets are laminated to each side of the cellular structure.

Cellular structures typically used in prefabricated wall panels are made up of continuous, corrugated or sinuous elements which form a honeycomb-like cell pattern in which each cell has a triangular or hexagonal cross section configuration. The triangular cell configuration is most desirable in many wall panel applications because it provides a rigid, truss-like core structure with greater rigidity, resistance to cell collapse and folding etc. than other cell configurations.

In a wall panel incorporating a triangular cell configuration one or both panel facing sheets usually are glued to the peaks or nodes of the corrugated elements. Inasmuch as these peaks or nodes provide a discontinuous gluing surface, the completed panel often has an undesirable appearance because the unglued portions of the facing sheets between the corrugation nodes tend to become warped.

Several structural materials which would be highly desirable as wall panel cellular core material are unsuitable for use in the continuous forming and assembly processes normally used to make corrugated cell elements. These materials must be formed by a noncontinuous process in which heat and pressure are applied in accordance with suitable cooling and/or setting times. One example of such material is high density cellulose fibres.

SUMMARY OF THE INVENTION

This invention provides a cellular structure having triangular cells and mutually opposed continuous gluing surfaces to which the panel facing sheets are secured without danger of deformation. The cellular structure is made up of individual cell segments which are interengaged with each other to form the desired cellular pattern. The cell segments may be fabricated individually from material which must be formed by the above-described noncontinuous process.

According to a preferred embodiment of this invention a cellular structure suitable for use as a honeycomb core in a "sandwich" panel construction is made up of a plurality of serially arranged, interengaged cell segments. Each cell segment includes a main body portion having a generally triangular cross sectional configuration and flat leg portion projecting from one tip of the main body portion parallel to the main body portion side opposite this tip. When a plurality of such cell segments are interengaged, these main body portion sides and the leg portions form substantially continuous outer surfaces to which respective panel facing sheets can be glued without danger of subsequent warping. While preferably the cell segments have generally equilateral sides, they may have unequal sides, if desired.

Other objects, features and advantages of this invention will become apparent in the detailed description to follow taken in conjunction with the accompanying drawings in which like parts bear like reference numerals.

DETAILED DESCRIPTION OF THE PREFERRED EMBODIMENT

Figure 1:
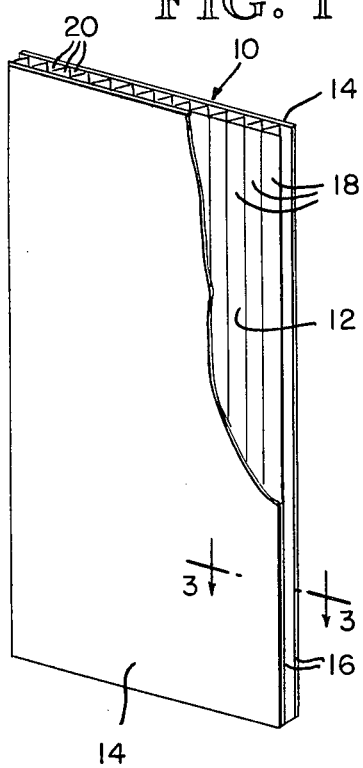
FIG. 1 is a perspective of a panel incorporating the cellular core structure of this invention, with part of one panel facing sheet broken away.

The core structure of this invention may be used in a "sandwich" type panel construction illustrated in FIG. 1. The illustrated panel conprises cellular structure 10 generally rectangular in cross section for providing substantially continuous, parallel, outer surfaces 12 to which facing sheets 14 are secured by respective layers of adhesive or glue 16. The panel is useful in construction of prefabricated dwellings, housing modules, etc. and is adaptable to both indoor and outdoor environments by varying the material and surface finish of the panel outer facing sheets 14.

The cellular structure 10 includes a plurality of parallel, serially arranged, interengaged, elongated cell segments 18 which form a series of equilateral, generally triangularly outlined cells 20. In the example of FIG. 1, the cell segments extend longitudinally of the panel; however, they may extend transversely, if desired. The length of the cell segments corresponds to the lateral or longitudinal dimension of the panel as the case may be. Although the panels will normally be prefabricated, the cellular structure 10 may be assembled or disassembled at the construction site if desired. To this end, the cell segments are mutually self nesting so that they may be interengaged and assembled into the core structure 10 with minimum use of tools, risk and experience. The triangular cells 20 may be filled with suitable insulating material to provide added protection against noise, vibration, heat, etc.

Figure 2:
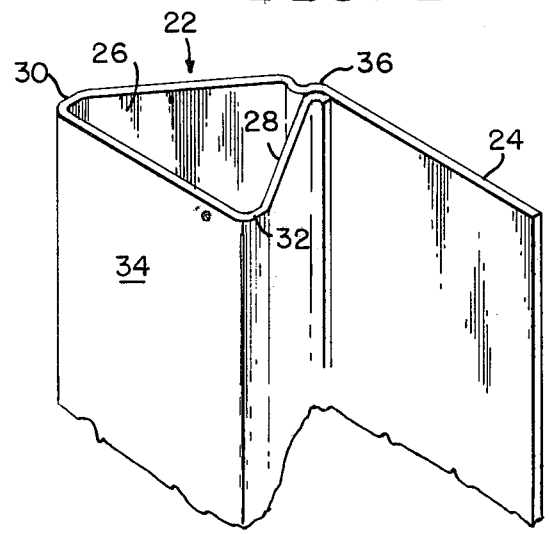
FIG. 2 is a perspective of a cell segment of the cellular core of FIG. 1.
Figure 3:
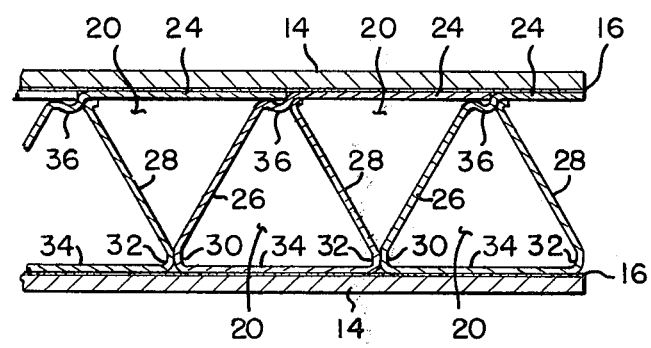
FIG. 3 is a cross section in expanded scale taken along lines 3—3 in FIG. 1.

As most clearly shown in FIGS. 2 and 3, each cell segment 18 is a monolithic plate-like member which is folded to form a substantially equilateral, triangular main body portion 22 and a flat leg portion 24. The main body portion 22 includes oppositely inclined left and right side walls 26 and 28 intersected at lower tip portions 30 and 32 by a bottom wall 34. The upper end of the right side wall 28 conforms to and is engaged with the underside of the upper tip portion 36 at the juncture between the latter and the leg portion 24. The left side wall 26 merges at the upper tip portion 36 with leg portion 24 which projects outwardly from the upper tip portion 36 parallel to the main body portion bottom wall 34. The leg portion 24 is of sufficient width that it extends to and engages the upper tip portion 36 of an adjacent cell segment, and preferably is of the same width as the bottom wall 34. The leg portion 24, right side wall 28, and bottom wall 34 together form a Z-shaped segment, the upper and lower outer surface of which provide the above-described mutually parallel outer surfaces 12 to which the panel facing sheets are secured.

Figure 5:
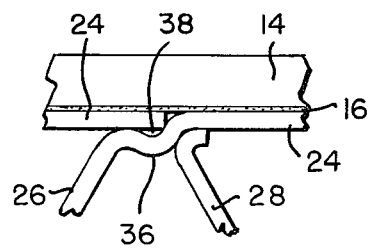
FIGS. 4 and 5 are fragmentary cross sections generally similar to FIG. 3 in expanded scale.
Figure 4:
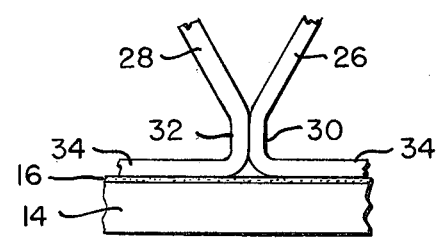

The cell segments 18 are self nesting as they are interengaged. As best shown in FIG. 4, the lower main body tip portions 30 and 32 may be flattened so that they squarely abut against the lower tip portions of adjacent cell segments 18. These tip portions, of course, may be secured together by adhesive. Referring now to FIG. 5, the main body portion upper tip 36 forms a generally U-shaped recess 38 with which the end of the leg portion 24 of an adjacent cell segment 18 is overlappingly engaged, as shown (see also FIG. 3). Thus it will be appreciated that pressure applied generally perpendicularly to the illustrated panel sides forces the interengaged leg portions 24 and adjacent cell segments 18 into more positive engagement with each other. This lends additional rigidity to the composite core structure 10.

The cell segments 18 may be fabricated economically and at relatively high speed from suitable ductile materials. Examples of such materials are wood-fibre, sheet metal and plastic. However, to provide a core structure with improved structural characteristics, the cell segments may be fabricated from the above-described materials requiring noncontinuous forming.

While the preferred embodiment of the invention has been illustrated and described herein, it should be understood that variations will be apparent to one skilled in the art. For example, the panel may include only one facing sheet 14, or the facing sheets 14 may be eliminated by securing the cell segments to each other. Accordingly, the invention is not to be limited to the specific embodiment illustrated and described herein.

What is claimed is:

1. A honeycomb cellular structure comprising a plurality of serially arranged triangular cross-section cell segments individually formed and secured together, each said cell segment including three flat sides forming three tip portions therebetween, a substantially flat leg portion projecting from one of said tip portions in a plane parallel to a plane defined by the flat side extending between the remaining said tip portions, said leg porion extending for a sufficient distance to directly contact the corresponding one tip portion of the next succeeding cell segment, said one tip portion including a recessed area for receiving the terminus of a leg portion of an immediately adjacent cell segment, said leg portions of all cell segments being substantially coplanar and a tip portion in the plane opposite said one tip portion of each cell segment from which the leg portion projects being in contact with a tip portion of the next succeeding cell segment.

2. A cellular structure as defined in claim 1, wherein said flat sides are dimensioned to form an equilateral triangular shape in cross-section.

3. A cellular structure as defined in claim 1, wherein the width of each said side measured from tip portion to tip portion is substantially equal to the width of said leg portion measured from said one tip portion of one cell segment to a corresponding tip portion of an immediately adjacent cell segment.

4. A cellular structure as defined in claim 1, wherein said leg portion and said side between said tip portions opposite said one tip portion form, respectively, a pair of opposed substantially continuous surfaces of generally planar configuration and further including a facing sheet secured to one of said planar surfaces.

5. A cellular structure as defined in claim 4, further including a second facing sheet secured to said other planar surface.

6. A cellular structure as defined in claim 5, wherein said cell segments and said facing sheets are adhesively bonded together.

7. A cellular structure as defined in claim 1, wherein said remaining tip portions opposite said one tip portion include flattened areas for engaging corresponding flattened areas on adjacent cell segments.

8. A cell segment suitable for a composite cellular structure, comprising: a main body portion having a closed substantially triangular cross sectional configuration, said main body portion including oppositely inclined side walls and a bottom wall therebetween, and three tip portions formed by adjacent edge portions of said three walls, said bottom wall having a substantially flat outer surface, said side walls terminating in one tip portion opposite said bottom wall, a leg portion having a substantially flat outer surface projecting from said one tip portion, the outer surface of said leg portion being substantially parallel to the outer surface of said bottom wall, said leg portion extending to a terminus spaced from said one tip portion by a distance equal to the width of the bottom wall measured from tip portion to tip portion, said one tip portion including a recessed area for receiving the terminus of a leg portion of an immediately adjacent cell segment, whereby plural identical cell segments may be secured together by contacting the leg portion terminus and a bottom wall tip portion, respectively, within the recessed area of the one tip portion and a bottom wall tip portion of an immediately adjacent cell segment to form a pair of opposed substantially continuous surfaces by the adjacent planar positioning of the leg portions and bottom walls, respectively.

9. A cell segment as defined in claim 8, wherein said tip portions opposite said one tip portion include flattened areas for engaging corresponding flattened areas on adjacent cell segments.

10. A cell segment as defined in claim 8, wherein said side and bottom walls form an equilateral triangular shape in cross section.

* * * * *